(12) United States Patent
Yamada et al.

(10) Patent No.: US 10,527,506 B2
(45) Date of Patent: Jan. 7, 2020

(54) PRESSURE SENSOR

(71) Applicant: Kitagawa Industries Co., Ltd., Aichi (JP)

(72) Inventors: Kazuki Yamada, Gifu (JP); Yasuo Kondo, Aichi (JP)

(73) Assignee: KITAGAWA INDUSTRIES CO., LTD., Aichi (JP)

( * ) Notice: Subject to any disclaimer, the term of this patent is extended or adjusted under 35 U.S.C. 154(b) by 9 days.

(21) Appl. No.: 15/963,241

(22) Filed: Apr. 26, 2018

(65) Prior Publication Data

US 2019/0128753 A1 May 2, 2019

(51) Int. Cl.
| G01L 1/00 | (2006.01) |
| G01L 1/20 | (2006.01) |
| G01L 9/02 | (2006.01) |
| G01L 9/00 | (2006.01) |
| H01C 10/10 | (2006.01) |
| H01C 17/06 | (2006.01) |

(52) U.S. Cl.
CPC ............ *G01L 1/205* (2013.01); *G01L 9/0002* (2013.01); *G01L 9/02* (2013.01); *H01C 10/10* (2013.01); *H01C 10/106* (2013.01); *H01C 17/06* (2013.01)

(58) Field of Classification Search
CPC ......... G01L 1/205; G01L 9/0002; G01L 9/02; H01C 10/106; H01C 17/06
USPC .................................................. 73/862.621
See application file for complete search history.

(56) References Cited

U.S. PATENT DOCUMENTS

| 2009/0120696 A1* | 5/2009 | Hayakawa | .............. G01L 1/205 |
| | | | 178/18.05 |
| 2010/0033196 A1* | 2/2010 | Hayakawa | ............... G01B 7/22 |
| | | | 324/686 |
| 2011/0084346 A1 | 4/2011 | Mori | |
| 2014/0366650 A1* | 12/2014 | Thillainadarajah | .... A63B 69/36 |
| | | | 73/862.625 |
| 2017/0131163 A1* | 5/2017 | LaBelle | .................. A42B 3/046 |
| 2017/0361045 A1* | 12/2017 | Fu | ...................... A61M 16/0683 |
| 2018/0157353 A1* | 6/2018 | Sleeman | ................ G01D 5/241 |

FOREIGN PATENT DOCUMENTS

JP           2010230647 A     10/2010

* cited by examiner

*Primary Examiner* — Max H Noori
(74) *Attorney, Agent, or Firm* — Renner, Otto, Boisselle & Sklar, LLP

(57) ABSTRACT

A pressure sensor includes: a base including an outer surface partially or entirely composed of a curved surface; a plurality of electrodes disposed on the outer surface of the base with spaces therebetween and including at least one signal electrode and at least one ground electrode; and at least one variable resistor made from conductive foam elastomer material and configured to be elastically compressed upon application of pressure and such that electric resistance between the signal electrode and the ground electrode decreases as the amount of the compression increases.

7 Claims, 1 Drawing Sheet

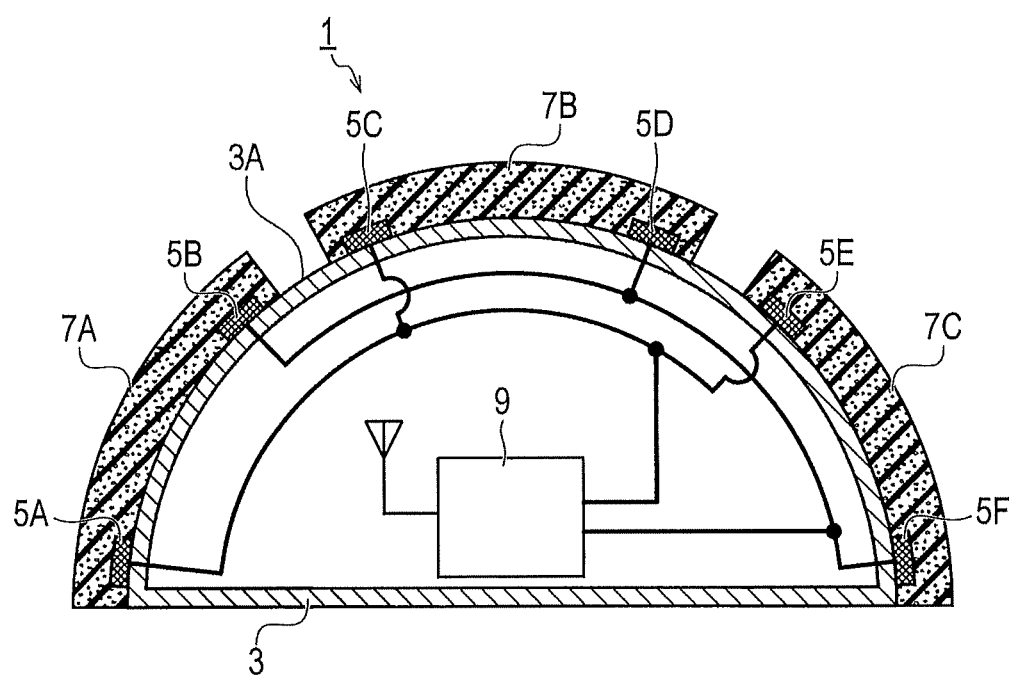

PRESSURE SENSOR

CROSS-REFERENCE TO RELATED APPLICATIONS

This application claims the benefit of Japanese Patent Application No. 2017-090416 filed Apr. 28, 2017 in the Japan Patent Office, and the entire disclosure of Japanese Patent Application No. 2017-090416 is incorporated herein by reference.

BACKGROUND

The present disclosure relates to pressure sensors.

A pressure sensor is known in which a pair of interdigital electrodes and a resistor layer are stacked (for example, see Japanese Unexamined Patent Application Publication No. 2010-230647A). In such a pressure sensor, a slight gap is defined between the interdigital electrodes and the resistor layer, and as a load applied in the stacking direction of the interdigital electrodes and the resistor layer increases, the surface area of contact between the interdigital electrodes and the resistor layer increases. With this configuration, an increase in the load applied to the pressure sensor reduces electric resistance between one interdigital electrode and the other interdigital electrode by the amount of the increase in the surface area of contact between the interdigital electrodes and the resistor layer. By reading this change in the electric resistance, pressure applied to the pressure sensor can be measured.

SUMMARY

Unfortunately, the interdigital electrodes of the above-described pressure sensor are disposed on one surface of a base shaped into a flat plate, so that it is difficult in some cases to use the pressure sensor to measure pressure applied to a curved surface.

According to an aspect of the present disclosure, it is desirable to provide a pressure sensor that can measure pressure applied to a curved surface.

According to an aspect of the present disclosure, a pressure sensor includes: a base including an outer surface partially or entirely composed of a curved surface; a plurality of electrodes disposed on the outer surface of the base with spaces therebetween and including at least one signal electrode and at least one ground electrode; and at least one variable resistor made from conductive foam elastomer material having electrical conductivity imparted by dispersing conductive filler in elastomer material, the conductive foam elastomer material being obtained by foaming the elastomer material, the at least one variable resistor being at least partially disposed along the curved surface and coming into contact with the at least one signal electrode and the at least one ground electrode, the at least one variable resistor being configured to be elastically compressed upon application of pressure and such that electric resistance between the at least one signal electrode and the at least one ground electrode decreases as an amount of compression increases.

In the pressure sensor thus configured, the outer surface of the base is partially or entirely composed of the curved surface, and the above-described variable resistor is disposed along the curved surface. When applied with pressure, the variable resistor is elastically compressed. As the amount of the compression increases, electric resistance between the signal electrode and the ground electrode decreases. By detecting a change in the electric resistance between the signal electrode and the ground electrode, pressure applied to the curved surface can be measured.

BRIEF DESCRIPTION OF THE DRAWINGS

The invention will be described with reference to the accompanying drawings, wherein like numbers reference like elements.

FIG. 1 illustrates a schematic configuration of a pressure sensor.

DESCRIPTION OF EMBODIMENTS

The above-described pressure sensor will now be described using exemplary embodiments.

Configuration of Pressure Sensor

A pressure sensor 1 illustrated in FIG. 1 includes a base 3, electrodes 5A to 5F, variable resistors 7A to 7C, and an information processor 9. The base 3 is a molded article made from resin (polypropylene in the present embodiment). The external shape of the base 3 corresponds to one of two portions obtained by dividing a cylinder in a plane parallel with the axial direction. In other words, the base 3 has one portion of the outer surface composed of a curved surface 3A corresponding to a side surface of the cylinder divided into two, and the remaining portion of the outer surface composed of semicircular flat surfaces corresponding to end surfaces of the cylinder divided into two and a rectangular flat surface corresponding to the cross section of the cylinder divided into two.

The electrodes 5A to 5F are disposed on the outer surface of the base 3 with spaces therebetween. At least one of the electrodes 5A to 5F is used as a signal electrode, and at least another one of the electrodes 5A to 5F is used as a ground electrode. In the present embodiment, among the six electrodes 5A to 5F illustrated in FIG. 1, three electrodes 5A, 5C, 5E are used as signal electrodes (hereinafter referred to as signal electrodes 5A, 5C, 5E), and three electrodes 5B, 5D, 5F are used as ground electrodes (hereinafter referred to as ground electrodes 5B, 5D, 5F). However, FIG. 1 only illustrates a schematic configuration, exemplifying a cross section of the pressure sensor 1, and another electrode may be additionally disposed in a position that cannot be seen in FIG. 1.

The variable resistors 7A to 7C are made from conductive foam elastomer material having electrical conductivity imparted by dispersing conductive filler in elastomer material and obtained by foaming the elastomer material.

More specifically, the present embodiment uses, as the elastomer material, elastomer material obtained by formulating styrenic elastomer (styrene-ethylene-ethylene-propylene-styrene block copolymer (SEEPS) having a molecular weight of 100000 and a styrene content of 30 mass % and available from Kuraray Co., Ltd. under the product name of SEPTON (trade name) 4033) and hydrocarbon-based process oil (paraffin-based process oil having a kinematic viscosity of 30.9 mm$^2$/s at 40° C., a molecular weight of 400, and a SP value of 7.4) as a softener (in a formulation ratio of 22.8 parts by mass of SEEPS and 77.2 parts by mass of the hydrocarbon-based process oil). As the conductive filler, vapor grown carbon fibers (having an average fiber diameter of 0.15 μm (micrometer), a fiber length of 10 to 20 μm, and an aspect ratio of 66.7 to 133.3, and available from Showa Denko K.K. under the product name of VGCF (trade name)—H) are used. A commercially available foaming agent (available from Dainichiseika Color & Chemicals Mfg. Co., Ltd. under the product name of Daifoam H850) is also formulated to foam the elastomer material.

In the present embodiment, the above-described materials are mixed in a formulation ratio of 35 parts by mass of the vapor grown carbon fibers and 3 parts by mass of the foaming agent with respect to 100 parts by mass of the elastomer material. The resultant mixture is extruded with a twin screw extruder to obtain a molded article of the conductive foam elastomer material containing very large number of closed cells. In the present embodiment, the conductive foam elastomer material has an expansion ratio of 2.01 times. This conductive foam elastomer material forms the variable resistors 7A to 7C having a planar shape. When applied with pressure, the variable resistors 7A to 7C are compressed depending on the pressure. As the amount of the compression increases, electric resistance of the variable resistors 7A to 7C decreases.

The variable resistors 7A to 7C are at least partially disposed along the curved surface 3A. The curved surface 3A of the base 3 has a plurality of regions (three regions exemplified in FIG. 1), and one of the variable resistors 7A to 7C is disposed in each of the regions. The variable resistor 7A comes into contact with the signal electrode 5A and the ground electrode 5B. The variable resistor 7B comes into contact with the signal electrode 5C and the ground electrode 5D. The variable resistor 7C comes into contact with the signal electrode 5E and the ground electrode 5F. When applied with pressure, the variable resistors 7A to 7C are elastically compressed. As the amount of the compression increases, electric resistance between the signal electrodes 5A, 5C, 5E and the ground electrodes 5B, 5D, 5F decreases.

In the present embodiment, the variable resistors 7A to 7C are molded so as to have a thickness of 1 mm to 10 mm and have an electric resistance of $1 \times 10^3 \Omega$ (ohm) or greater with no pressure applied. With pressure applied, the variable resistors 7A to 7C are compressed so as to have a thickness 80% or less of that with no pressure applied and have an electric resistance from $\frac{1}{500}$ to $\frac{1}{10}$ of that with no pressure applied.

In the present embodiment, the variable resistors 7A to 7C are disposed on the outer surface of the base 3 with spaces between the adjacent variable resistors 7A, 7B and between the adjacent variable resistors 7B, 7C. The outer surface of the base 3 thus has one portion covered with the variable resistors 7A to 7C and the remaining portion not covered with the variable resistors 7A to 7C.

The information processor 9 is disposed in the base 3 and configured to acquire electric resistance values between the signal electrodes 5A, 5C, 5E and the ground electrodes 5B, 5D, 5F and to transmit the electric resistance values or information indicating pressure calculated from the electric resistance values to a communication device outside the base 3.

(Effects)

In the pressure sensor 1 thus configured, the outer surface of the base 3 is partially composed of the curved surface 3A, and the above-described variable resistors 7A to 7C are disposed along the curved surface 3A. When applied with pressure, the variable resistors 7A to 7C are elastically compressed. As the amount of the compression increases, electric resistance between the signal electrodes 5A, 5C, 5E and the ground electrodes 5B, 5D, 5F decreases. By detecting a change in the electric resistance between the signal electrodes 5A, 5O, 5E and the ground electrodes 5B, 5D, 5F, pressure applied to the curved surface 3A can be measured.

In the present embodiment, the variable resistors 7A to 7C are combined to conform to the shape of the curved surface 3A. This configuration allows the individual variable resistors 7A to 7C to have a simpler shape than the case in which a single variable resistor is configured to conform to the shape of the curved surface 3A. Thus, even in a case where the variable resistors 7A to 7C are composed of planar bodies as described above, the planar bodies are not required to be curved into complex shapes in conformance with the entire curved surface 3A, so that the variable resistors 7A to 7C can be readily composed of the planar bodies.

In the present embodiment, the portion not covered with the variable resistors 7A to 7C in the outer surface of the base 3 can be utilized for wireless communications between the information processor 9 in the base 3 and a communication device outside the base 3. Thus, information or the like detected by the pressure sensor 1 can be transmitted to the communication device through wireless communications, and a device outside the pressure sensor 1 can perform various types of processing based on the transmitted information.

Other Embodiments

An exemplary embodiment has been used to describe the pressure sensor 1, but this embodiment should not be construed to be any more than an example of one form of the present disclosure. In other words, the present disclosure is not limited to the exemplary embodiment described above and can be embodied in various forms without departing from the technical concept of the present disclosure.

For example, the above-described embodiment has exemplified the base 3 having a shape corresponding to a cylinder divided into two; however, the base may have a shape other than the above-described example. For example, the base may be a cylinder that is not divided or that is divided into three or more. Alternatively, the base may be a cone instead of a cylinder. This cylinder or cone base may be a right circular cylinder or cone, of which the axial direction is orthogonal to the bottom surface, or an oblique circular cylinder or cone, of which the axial direction is inclined relative to the bottom surface. Alternatively, the base may be a cone of which one portion has been cut away (for example, a truncated cone). Alternatively, the base may have a shape other than a cylinder or cone, for example, a sphere, an ellipsoid, or a spheroid. Alternatively, the base may be shaped into a ring (e.g., a donut shape).

Note that a function realized by a single constituent element in the above-described embodiments may instead be realized by a plurality of constituent elements. Additionally, a function realized by a plurality of constituent elements may instead be realized by a single constituent element. Parts of the configurations in the above-described embodiments may be omitted. At least part of the configuration of one of the above-described embodiments may be added to or replace the configuration of another of the above-described embodiments.

Supplementary Description

Note that the pressure sensor according to the present disclosure may be further provided with configurations such as those given below.

In the pressure sensor of the present disclosure, the variable resistors may include planar bodies obtained by molding conductive foam elastomer material into a planar shape, the curved surface may have a plurality of regions, and one of the variable resistors may be disposed in each of the regions.

In the pressure sensor thus configured, the above-described variable resistors including the planar bodies are disposed in the above-described regions. This configuration allows the variable resistors to be combined to conform to the shape of the curved surface and allows the individual variable resistors to have a simpler shape than the case in which a single variable resistor is configured to conform to the shape of the curved surface. Thus, even in a case where the variable resistors are composed of the above-described planar bodies, the planar bodies are not required to be curved into complex shapes in conformance with the entire curved surface, so that the variable resistors can be readily composed of the planar bodies.

In the pressure sensor of the present disclosure, the variable resistors may have a thickness of 1 mm to 10 mm and an electric resistance of $1\times10^3\Omega$ or greater with no pressure applied. With pressure applied, the variable resistors may be compressed so as to have a thickness 80% or less of that with no pressure applied and have an electric resistance from $\frac{1}{500}$ to $\frac{1}{10}$ of that with no pressure applied.

In the pressure sensor of the present disclosure, the outer surface of the base may have one portion covered with the variable resistors and the remaining portion not covered with the variable resistors.

In the pressure sensor thus configured, the portion not covered with the variable resistors in the outer surface of the base can be utilized to add a function that cannot be achieved only with the portion covered with the variable resistors.

As an example of such a function, in the pressure sensor of the present disclosure, the information processor may be disposed in the base and configured to acquire electric resistance values between the signal electrodes and the ground electrodes and to transmit the electric resistance values or information indicating pressure calculated from the electric resistance values to a communication device outside the base.

In the pressure sensor thus configured, the portion not covered with the variable resistors can be utilized for wireless communications between the information processor in the base and the communication device outside the base. Thus, information or the like detected by the pressure sensor can be transmitted to the communication device through wireless communications, and a device outside the pressure sensor can perform various types of processing based on the transmitted information.

What is claimed is:

1. A pressure sensor comprising:
   a base including an outer surface partially or entirely composed of a curved surface;
   a plurality of electrodes disposed on the outer surface of the base with spaces between the electrodes and including first and second signal electrodes and first and second ground electrodes; and
   a first variable resistor and a second variable resistor each made from a conductive foam elastomer material having electrical conductivity imparted by dispersing conductive filler in an elastomer material, the conductive foam elastomer material being obtained by foaming the elastomer material, wherein
   the first variable resistor is at least partially disposed along the curved surface of the base and is in contact with the first signal electrode and the first ground electrode,
   the first variable resistor is configured to be elastically compressed when pressure is applied thereto such that an electric resistance between the first signal electrode and the first ground electrode decreases as an amount of the compression applied to the first variable resistor increases,
   the second variable resistor is at least partially disposed along the curved surface of the base and is in contact with the second signal electrode and the second ground electrode, and
   the second variable resistor is configured to be elastically compressed when pressure is applied thereto such that an electric resistance between the second signal electrode and the second ground electrode decreases as an amount of the compression applied to the second variable resistor increases, and
   a clearance is provided between the first variable resistor and the second variable resistor on the curved surface of the base.

2. The pressure sensor according to claim 1, wherein
   at least one of the first and second variable resistors has a sheet-like body obtained by molding the conductive foam elastomer material into a sheet-like shape, and
   the first and second variable resistors are disposed respectively in regions of the curved surface of the base.

3. The pressure sensor according to claim 1, wherein
   each of the first and second variable resistors has a thickness of between 1 mm and 10 mm and an electric resistance of $1\times10^3\Omega$ or greater when no pressure is applied thereto, and
   when the pressure is applied to the each of the first and second variable resistors, the each of the first and second variable resistors is compressed to have a thickness 80% or less than the thickness in the case where no pressure is applied thereto and to have an electric resistance of between $\frac{1}{500}$ and $\frac{1}{10}$ of the electric resistance in the case where no pressure is applied thereto.

4. The pressure sensor according to claim 1, further comprising an information processor disposed inside the base and configured to acquire a first electric resistance value between the first signal electrode and the first ground electrode and a second electric resistance value between the second signal electrode and the second ground electrode and to transmit the first and second electric resistance values or information indicating pressure calculated from first and second the electric resistance values to a communication device outside the base.

5. The pressure sensor according to claim 2, wherein
   each of the first and second variable resistors has a thickness of between 1 mm and 10 mm and an electric resistance of $1\times10^3\Omega$ or greater when no pressure is applied thereto, and
   when pressure is applied to the each of the first and second variable resistors, the each of the first and second variable resistors is compressed to have a thickness 80% or less than the thickness in the case where no pressure is applied thereto and to have an electric resistance of between $\frac{1}{500}$ and $\frac{1}{10}$ of the electric resistance in the case where no pressure is applied thereto.

6. The pressure sensor according to claim 2, further comprising an information processor disposed inside the base and configured to acquire a first electric resistance value between the first signal electrode and the first ground electrode and a second electric resistance value between the second signal electrode and the second ground electrode and to transmit the first and second electric resistance values or information indicating pressure calculated from the first and second electric resistance values to a communication device outside the base.

7. The pressure sensor according to claim 3, further comprising an information processor disposed inside the base and configured to acquire a first electric resistance value between the first signal electrode and the first ground electrode and a second electric resistance value between the second signal electrode and the second ground electrode and to transmit the first and second electric resistance values or information indicating pressure calculated from the first and second electric resistance values to a communication device outside the base.

\* \* \* \* \*